Figure 1:
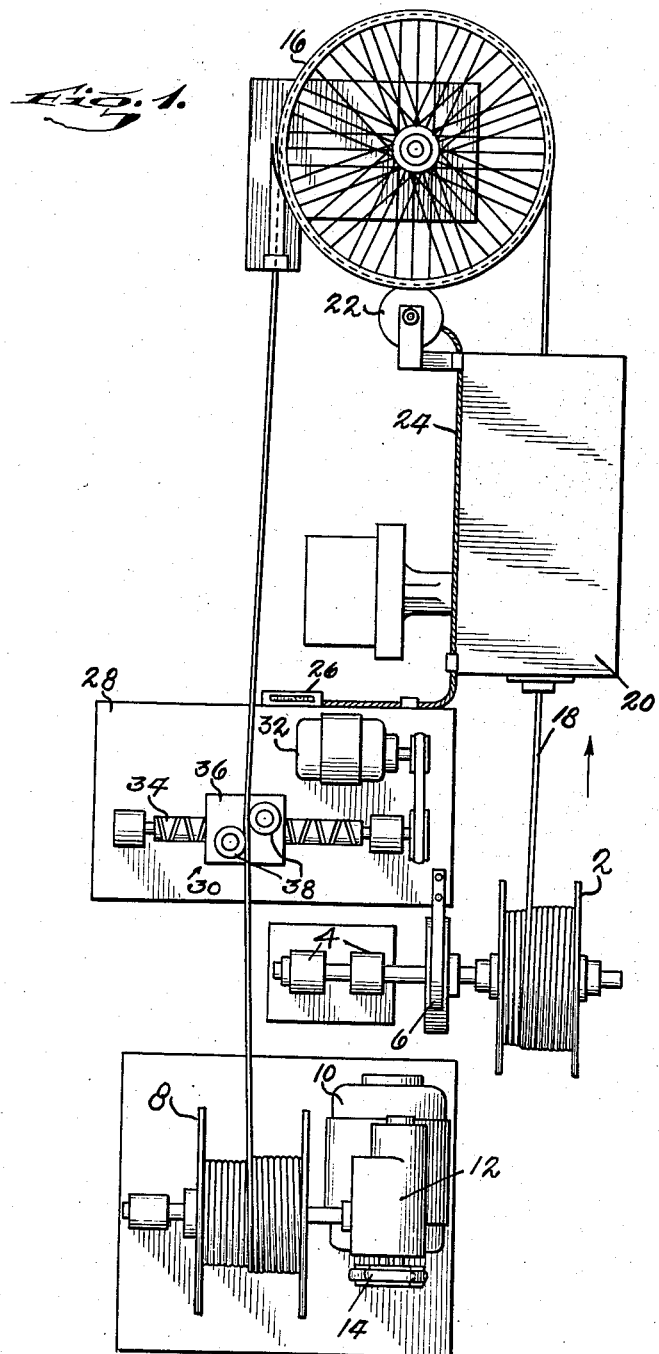

April 14, 1959  C. R. SHEETS  2,882,490
WIRE-TESTING AND MEASURING APPARATUS
Filed Dec. 28, 1955  3 Sheets-Sheet 1

INVENTOR.
CHESTER R. SHEETS
BY James G. Bethell
ATTORNEY.

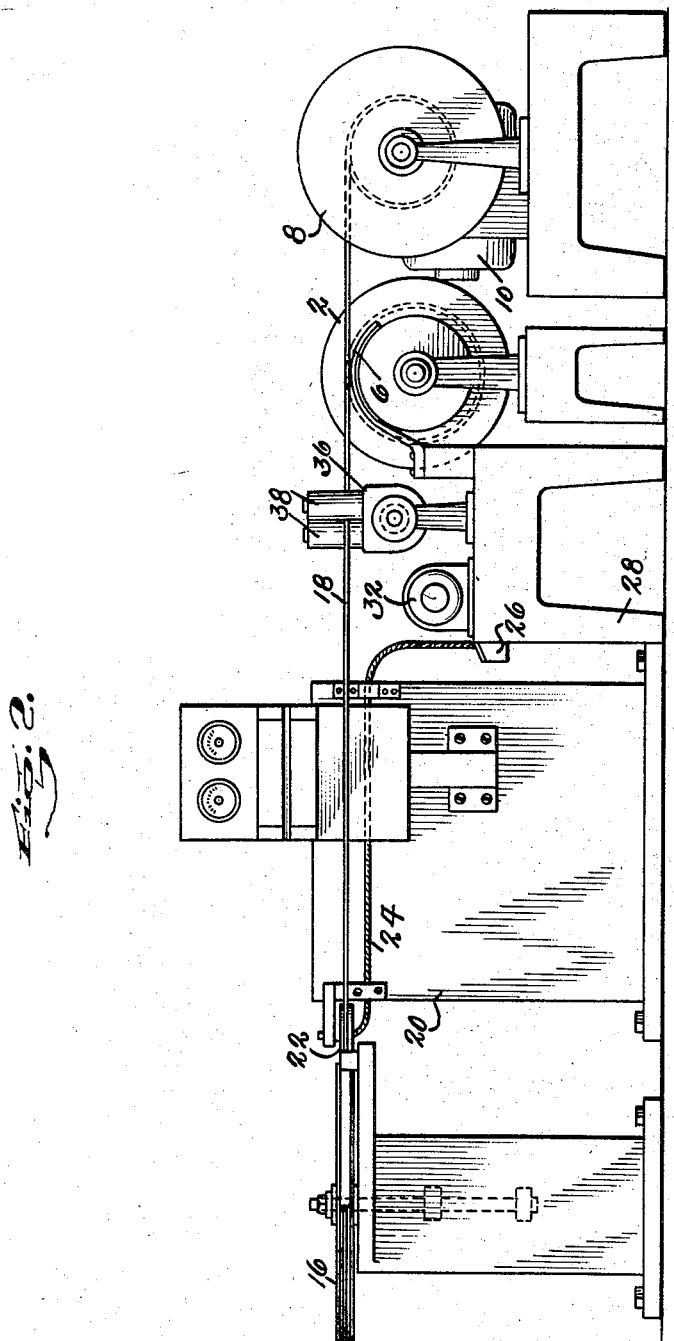

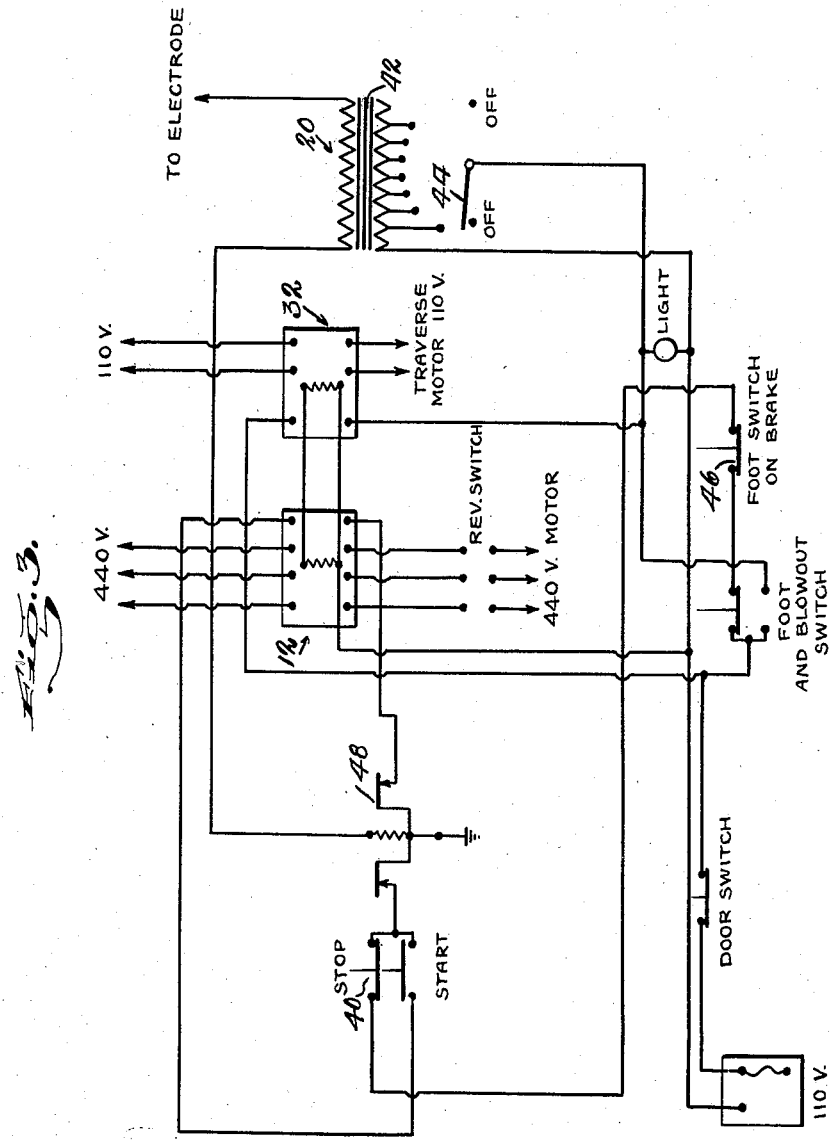

United States Patent Office 2,882,490
Patented Apr. 14, 1959

2,882,490
WIRE-TESTING AND MEASURING APPARATUS

Chester R. Sheets, East Paterson, N.J., assignor to The Okonite Company, Passaic, N.J., a corporation of New Jersey Application December 28, 1955, Serial No. 555,900

4 Claims. (Cl. 324—54)

My invention is directed to new and improved apparatus for testing insulated wire and for recording the footage of the tested wire.

One of the objects of my invention is to provide simple and sturdy apparatus for testing insulated wire and for measuring the footage of wire tested, which apparatus requires only the minimum of floor space for installation, as compared with wire-testing and measuring equipment in existence prior to my invention.

In general, my improved apparatus comprises a let-off reel, which carries the wire, and a take-up reel, upon which the wire is wound after testing and measuring. These two reels are placed at one end of the apparatus. At the other end of the apparatus I provide a pulley about which the wire is passed during operation of the apparatus, so that the wire travels in one direction from the let-off reel to the pulley and is then reversed in direction from the pulley to the take-up reel. In its passage from the let-off reel to the pulley the wire is being continuously tested, and as it passes about the pulley, its footage is measured. Suitable controls are provided within easy reach of an attendant.

In the accompanying drawings,

Fig. 1 shows my improved apparatus in plan;
Fig. 2 is a side-elevational view; and
Fig. 3 is a wiring diagram.

Referring to the drawings in detail, with particular reference to Figs. 1 and 2:

2 designates a let-off reel, mounted in suitable bearings 4 at one end of the apparatus, the reel being provided with suitable brake shoe 6 to prevent overrunning. The let-off reel, as will be understood, carries the insulated wire which is to be tested and the footage of which is to be measured.

Mounted at the same end of the apparatus as the let-off reel is take-up reel 8, upon which the wire after being tested and measured, is rewound. The take-up reel is driven by reversible electric motor 10 through gear reducer 12 and is equipped with a foot-operated brake 14.

At the opposite end of the apparatus from the reels 2 and 8 I provide a pulley 16. This pulley is mounted to rotate about a perpendicular axis. The reels 2 and 8 rotate about horizontal axes.

The wire to be tested and measured has been designated 18 and, as seen from Fig. 1, when the apparatus is in operation, the wire is drawn from the let-off reel 2 by the take-up reel 8, passing through electric testing apparatus 20 and then around the pulley 16, where its direction is reversed, and from thence to the take-up reel 8, where it is rewound.

The periphery of the pulley 16 is grooved to permit the wire to be set into the pulley slightly so as to accommodate a driving pulley 22, which bears against the face of the periphery of the pulley 16 and is connected through a flexible shaft 24 to a footage indicator 26. As the wire being tested is drawn around pulley 16, the pulley rotates so as to rotate the driving pulley 22 for the footage indicator.

Mounted on a suitable bed or stand 28, intermediate the pulley 16 and the take-up reel 8 so as to be in the path of the wire 18 as it moves from the pulley 16 to the take-up reel, are traverse mechanism 30 and its driving motor 32. This traverse mechanism comprises the reversely double-threaded shaft 34, which is driven by the motor 32, and traverse nut 36 threaded on this shaft, so that, as the shaft is rotated, the nut will traverse the shaft alternately in one direction and then in the opposite direction. The traverse nut carries a pair of vertically extending rollers 38, spaced from each other so that the wire 18 can pass between them to the take-up reel.

From the description thus far given, it will be apparent that in the operation of my apparatus the wire 18 is drawn off the let-off reel 2 through the testing mechanism 20 and then about the pulley 16 to the traverse mechanism 30, by which it is guided to the take-up reel 8, the passing of the wire about the pulley 16 operating the footage indicator 26, so that the wire is tested, measured, and rewound.

From the wiring diagram of Fig. 3 it will be seen that the circuits of the reversible motor 12 for the take-up reel and of the traverse motor 32 are opened and closed simultaneously by switch 40.

The electric testing mechanism 20 comprises a transformer 42, the primary of which is equipped with control switch 44, arranged to vary the output of the transformer in a well known manner, to accommodate the apparatus for testing insulated wires having different electrical characteristics. It will be seen from the diagram that the input or primary of the transformer 42 is controlled by the switch 40, so that the circuit of the transformer will be closed and opened with closure and opening of the circuits of the two motors 12 and 32.

The foot-operated brake 14 for the take-up reel 8 carries a switch 46, which is in series with the switch 40, so that in the first movement of the brake toward applied position the circuits to the two motors 12 and 32 and to the transformer 42 will be opened, thereby avoiding application of the brake with motor and transformer circuits closed.

48 designates a normally closed switch in series with the main switch 40. In testing the wire, its conductor is grounded and an electrode to which the secondary of the transformer 42 is electrically connected bears against the wire insulation. As long as the wire insulation is satisfactory, the switch 48 remains closed. However, when a fault is encountered in the wire insulation—and this may be a break in the insulation or simply a spot where the insulating properties of the insulation are below standard—the switch 48 will open, thereby opening the motor circuits and bringing the apparatus to rest. The attendant then opens the switch 40, makes the necessary repairs to the wire, and then again closes the switch 40, switch 48 closing automatically, of course, upon the closure of switch 40, and the apparatus will resume operation and continue until the wire supply is exhausted or until another fault is encountered.

From all of the foregoing it will be seen that I have provided an apparatus for the testing and measuring of insulated wire which is simple, sturdy, and compact, so as to require the minimum of floor space for installation and the minimum of skill for its operation.

It is to be understood that changes may be made in the details of construction and arrangement of parts hereinabove described within the purview of the invention.

What I claim is:

1. Wire-testing and measuring apparatus comprising, in combination, a let-off reel and a take-up reel mounted at one end of the apparatus and rotatable about horizontal axes; a pulley at the other end of the apparatus rotatable about a vertical axis; means for driving the take-up reel to draw a wire from the let-off reel and rewind it upon the take-up reel, the wire being reversed in its direction of travel by passing about the pulley, and the periphery of said pulley being grooved to receive the wire; a footage indicator for indicating the wire footage passed about said pulley; and a drive for said indicator comprising a driving pulley overlying the wire out of contact therewith and bearing against the periphery of the first-mentioned pulley so as to be frictionally driven thereby, and a flexible shaft attached to the driving pulley and to the said indicator.

2. Wire-testing and measuring apparatus comprising, in combination, a let-off reel and a take-up reel mounted at one end of the apparatus and rotatable about horizontal axes; a pulley at the other end of the apparatus rotatable about a vertical axis; an electric motor for driving the take-up reel to draw a wire from the let-off reel about said pulley to the take-up reel; a footage indicator for indicating the wire footage passed about said pulley; a driving pulley frictionally driven from the periphery of the first-mentioned pulley; a flexible shaft attached to said driving pulley and to said indicator for driving the latter; traversing mechanism intermediate said pulleys and take-up reel for guiding the wire to the take-up reel; an electric motor for driving the traverse mechanism; and a switch common to both motors for opening and closing the circuits of said motors simultaneously.

3. Wire-testing and measuring apparatus comprising, in combination, a let-off reel and a take-up reel mounted at one end of the apparatus; a pulley at the other end of the apparatus; an electric motor for driving the take-up reel to draw wire from the let-off reel about said pulley and to the take-up reel; electric wire-testing mechanism intermediate the let-off reel and said pulley for the continuous testing of the wire as it passes to said pulley; a footage indicator and traversing mechanism intermediate the said pulley and the take-up reel; a driving pulley frictionally driven from the periphery of the first-mentioned pulley; a flexible shaft attached to said driving pulley and to said indicator for driving the latter; an electric motor for driving the traverse mechanism; and a switch common to both motors and to the wire-testing mechanism for the simultaneous opening and closing of the circuits of said motors and the wire-testing mechanism.

4. Wire-testing and measuring apparatus comprising, in combination, a let-off reel and a take-up reel mounted at one end of the apparatus; a pulley at the other end of the apparatus; an electric motor for driving the take-up reel to draw wire from the let-off reel about said pulley and rewind it upon the take-up reel; electric wire-testing mechanism intermediate the let-off reel and pulley; a footage indicator intermediate the said pulley and take-up reel; a driving pulley frictionally driven from the periphery of the first-mentioned pulley; a flexible shaft connecting the said driving pulley to said footage indicator to drive the indicator; traversing mechanism for the wire intermediate the said driving pulley and take-up reel; an electric motor for driving the traverse mechanism; a foot brake for the first-mentioned electric motor; and a switch carried by said brake for opening the circuits of both motors and the circuit of the wire-testing mechanism as the brake is being applied but before full application of the brake.

References Cited in the file of this patent

UNITED STATES PATENTS

| | | |
|---|---|---|
| 2,099,112 | Hill | Nov. 16, 1937 |
| 2,707,332 | Smith | May 3, 1955 |
| 2,753,521 | Abrams | July 3, 1956 |